(12) United States Patent
Eich et al.

(10) Patent No.: US 6,322,477 B1
(45) Date of Patent: Nov. 27, 2001

(54) METHOD OF AND APPARATUS FOR INFLUENCING THE SHIFTING OF TRANSMISSIONS IN THE POWER TRAINS OF MOTOR VEHICLES

(75) Inventors: Jürgen Eich, Bühl; Michael Salecker, Stuttgart/Sonnenberg; Thomas Jäger, Bühl, all of (DE)

(73) Assignee: LuK Getriebe GmbH, Buhl/Baden (DE)

( * ) Notice: Subject to any disclaimer, the term of this patent is extended or adjusted under 35 U.S.C. 154(b) by 0 days.

(21) Appl. No.: 09/415,935

(22) Filed: Oct. 7, 1999

(30) Foreign Application Priority Data

Oct. 8, 1998 (DE) ................................ 198 46 430

(51) Int. Cl.⁷ ............................. F16H 59/60; F16H 59/62
(52) U.S. Cl. ......................... 477/97; 477/46; 477/903
(58) Field of Search ....................... 477/97, 903, 34; 364/424.27, 424.22, 424.83, 424.94; 701/65, 53, 50, 51, 55

(56) References Cited

U.S. PATENT DOCUMENTS

| | | | |
|---|---|---|---|
| 5,527,232 | * 6/1996 | Seidel et al. | 477/46 |
| 5,716,301 | * 2/1998 | Wild et al. | 477/97 |
| 5,757,949 | * 5/1998 | Kinoshita et al. | 382/104 |
| 5,832,400 | * 11/1998 | Takahashi et al. | 701/53 |
| 5,893,894 | * 4/1999 | Moroto et al. | 701/53 |
| 5,961,408 | * 10/1999 | Koing et al. | 474/18 |
| 5,999,875 | * 12/1999 | Bruedigam et al. | 701/110 |
| 6,085,137 | * 7/2000 | Aruga et al. | 701/51 |
| 6,098,005 | * 8/2000 | Tsukamoto et al. | 701/65 |

FOREIGN PATENT DOCUMENTS 11-051174 * 2/1999 (JP) .

* cited by examiner

Primary Examiner—Sherry Estremsky
Assistant Examiner—Tisha D. Lewis
(74) Attorney, Agent, or Firm—Darby & Darby

(57) ABSTRACT

A method for influencing a shift process connected with a change in transmission ratio when driving a motor vehicle that has a set of driven wheels subject to longitudinal and transverse forces, the method including detecting whether or not the vehicle is traveling around a curve and, if doing so when the shift process is in progress, influencing the shift process so as to decrease the longitudinal forces that act on the driven wheels as a result of the shift process. Also disclosed is an apparatus for performing the disclosed method including a detector for detecting whether or not the vehicle is traveling around a curve and a transmission ratio shifter responsive to the detector that, if the vehicle is traveling around a curve when the shift process is in progress, performs the shift process so as to decrease the longitudinal forces that act on the driven wheels as a result of the shift process.

28 Claims, 5 Drawing Sheets

METHOD OF AND APPARATUS FOR INFLUENCING THE SHIFTING OF TRANSMISSIONS IN THE POWER TRAINS OF MOTOR VEHICLES

BACKGROUND

1. Field of the Invention

The invention relates to a method for influencing a shift process connected with a change in transmission ratio when driving a motor vehicle.

2. Description of Related Art

It is known to control automatic transmissions so that up-shifting into a higher gear is prevented when traveling around a curve. The purpose is that a driver who, for example, lets upon on the accelerator immediately before a curve or in a curve and depresses the accelerator again after leaving the curve will have the same amount of torque available after the curve as when entering the curve. It is thus intended that a driver who for example lets up on the accelerator immediately before a curve or in a curve, after travelling past the curve when pushing down on the accelerator again has the same power and performance as when driving into the curve. During normal shift programs, letting up on the accelerator would lead to the transmission shifting into a higher gear and on leaving the curve there would be insufficient acceleration power or the transmissions would only shift back to a lower bear before renewed acceleration.

It is known from DE 196 18 804 to develop a method where shifts are suppressed in curves to the extent that in addition the type of driver is determined and the type of shift suppression is influenced.

In many cases, for example when travelling around very long curves or in the case of vehicles with manual shift transmissions it is neither desirable nor possible to fully suppress gear changes when travelling around curves. In these cases it is however desirable in order to let the shifting process take place in a manner that is adapted to the momentary conditions of a curved course of travel.

Accordingly the invention is concerned with the problem of providing a method for influencing a shift process connected to a change in transmission ratio when driving a motor vehicle which also leads when driving round curves to comfortable shifting which does not impair driving safety.

SUMMARY OF THE INVENTION

It is an object of the present invention to provide a method for influencing a shift process connected to a change in transmission ratio when driving a motor vehicle that results in comfortable shifting when driving around curves and does not impair driving performance or safety.

It is a further object of the present invention to provide an apparatus capable of performing the above described process.

The present invention influences the shift process that occurs during a change in transmission ratio when a motor vehicle follows a curved path, such as a curve in the road. This allows the driving character of the vehicle during the shift process to be altered as desired, such as the performance of the vehicle or maintaining adequate safety and control over the vehicle.

Preliminarily, the state of the vehicle in a curved path must be detected. This may be accomplished by detecting one or more characteristics of the vehicle that indicate the vehicle is driving in a curved path. Various characteristics, by way of example, may include the transverse force exerted on the drive wheels of the vehicle, the transverse acceleration of the vehicle, the steering angle, difference in speed between wheels on an axle, operating condition of vehicle systems, and the navigational position of the car. In addition, the measured characteristics may be compared against predetermined values or using algorithms to determine amount of actual or desired curvature of the vehicle path.

Once it is detected that the vehicle is traveling on a curved path, which may include the degree, the shift process during a transmission ratio change may be influenced in a predetermined way. The result of this influence may be, for example, to decrease the longitudinal forces that act on the driven wheels, increasing comfort, safety or performance. Ways to influence the shift process may include, by way of example, altering the rate of ratio change or clutch engagement, or modifying the activation of various running modes.

According to the present invention, an apparatus is provided for accomplishing the processes of the invention. The apparatus can include a detector for detecting whether the vehicle is traveling around a curve, and a transmission ratio shifter that is responsive to the detector and influences the shift process. The detector may be capable of detecting one or more characteristics of the vehicle that indicate that the vehicle is driving in a curved path. Examples of such detectors may include sensors to detect forces exerted on the driven wheels, vehicle acceleration, wheel speeds, steering angle, vehicle system operating parameters and navigational position of the car. The apparatus may also evaluate the vehicle characteristics, to which the transmission ratio shifter may respond in predetermined ways. The transmission ratio shifter, for example, may alter the rate of ratio change or clutch engagement, or modify the activation of various running modes.

BRIEF DESCRIPTION OF THE DRAWINGS

Other than objects and features of the present invention will be described hereinafter in detail by way of certain preferred embodiments with reference to the accompanying drawings in which.

DESCRIPTION OF PREFERRED EMBODIMENTS

Figure 1:
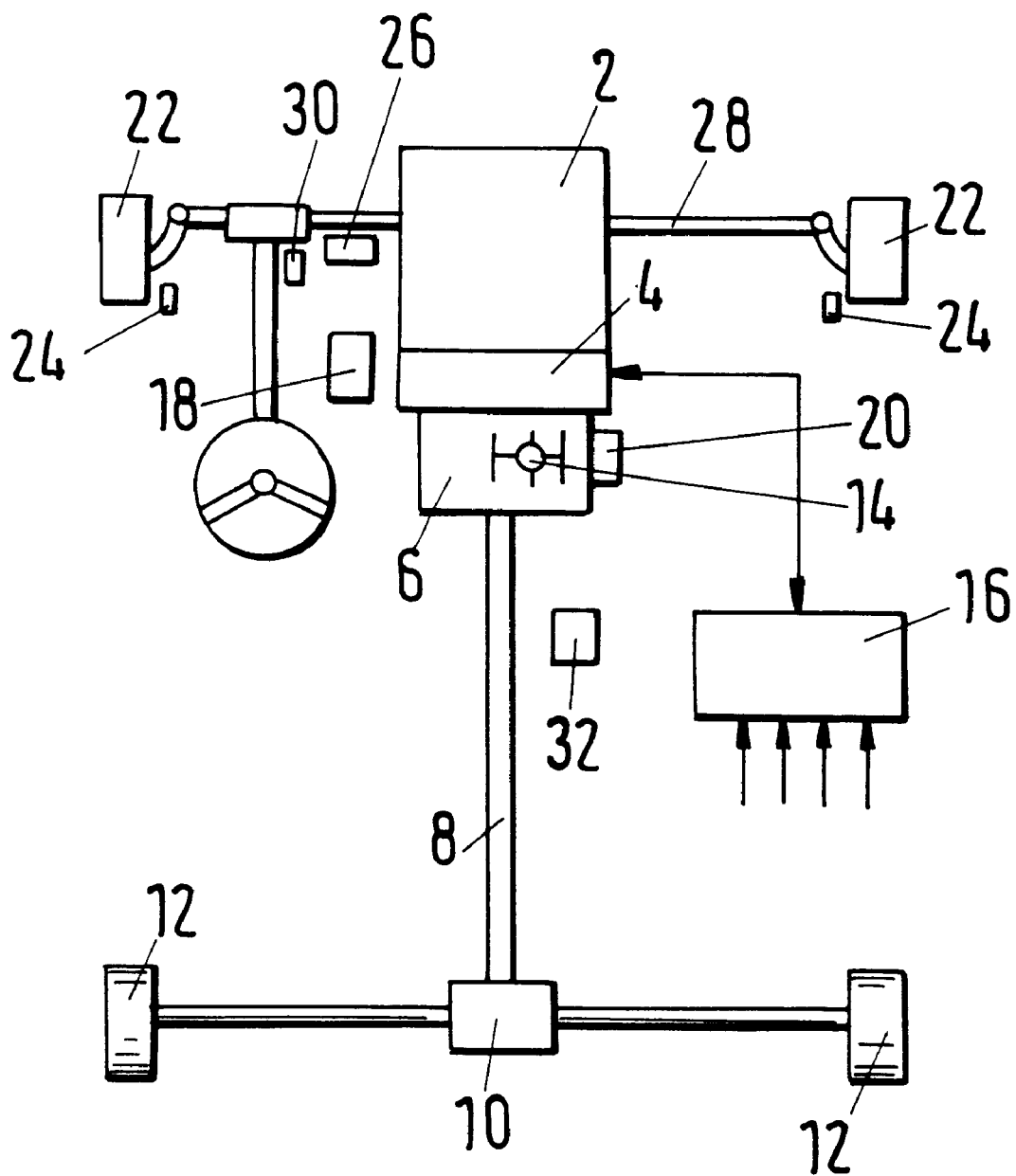
FIG. 1 is a schematic plan view of a motor vehicle in which a method according to an embodiment of the present invention may be utilized.

According to FIG. 1 a motor vehicle has an engine 2 connected to a gearbox 6. A drive shaft 8 leads from the gearbox 6 through a differential 10 to the rear wheels 12.

In the illustrated embodiment the gearbox 6 is a manual shift transmission which can be operated by a gear shift lever 14. The clutch 4 is automated and is operated by a control device 16 to which in known way for example the throttle valve position or the position of an accelerator pedal 18 and through a gearbox sensor 20 the position of a shift member in the gearbox and a shift intent are supplied as input signals.

The construction and method of functioning of the units described up until now are known per se and are used in vehicles having automated clutches where the shift lever 14 is indeed still activated by hand but where the clutch pedal is omitted because the clutch 4 is operated automatically.

According to the basic laws of physics only a limited force can be transmitted between a road and a wheel without the traction friction changing into sliding friction which is dangerous for driving safety. Accordingly the force which can be transmitted in the longitudinal direction of the vehicle is greater the smaller the force which is to be transmitted in the transverse direction of the vehicle. When shifting gears in certain circumstances on engagement of the clutch, when the engine is suddenly braked when changing into a higher gear or is suddenly accelerated when changing into a lower gear, the result is forces which are too high acting in the longitudinal direction of the vehicle and which reach the limit of the forces which can be transmitted. When the vehicle is additionally travelling round a curve and lateral forces have to be transmitted by the driven wheels, during clutch engagement the entire force which can be safely transmitted can be exceeded so that the vehicle breaks away or skids which is extremely negative regarding driving safety.

According to the invention the vehicle described up until now maybe provided with a facility which makes it possible to detect when the vehicle is travelling around a curve and to control the operation of the clutch accordingly. To this end different sensors are provided individually or in combination and which can detect the state of travelling around a curve. By way of example wheel sensors 24 are provided on the non-driven front wheels 22 to determine the wheel speeds and these wheel sensors can supply at the same time signals for an anti-locking braking system. Furthermore a steering angle sensor 26 can be provided which detects the position of a track rod 28 connected to the front wheels 22, and thus the steering angle. Furthermore or in addition a servo sensor 30 can be provided with which the operation of a servo system assisting steering is detected. In addition a transverse acceleration sensor 32 can be provided.

The sensors present in the vehicle are connected to the control device 16 in which algorithms are stored in the program memory to calculate from the determined input signals a value which describes the relevant state of travelling around a curve at that time.

There are various evaluating algorithms which can be used to determine a characteristic value for travelling around a curve.

By way of example the steering angle can be detected by means of the steering angle sensor 26 and exceeding a certain steering angle can be used alone as a characteristic of travelling around a curve.

Alternatively the steering angle can be detected and together with the vehicle speed and the fixed vehicle geometry a transverse acceleration can be calculated.

Alternatively the energy input of a servo pump or an electric servo motor can be detected by the servo sensor 30 and used as a characteristic for travelling around a curve.

If only the wheel sensors are present then the steering angle can be concluded from the differential speed of the wheels of one axle. The mean value of the wheel speeds is a measure of the vehicle speed so that the transverse acceleration can be calculated.

Again as an alternative or in addition the transverse acceleration can be used as a characteristic for the travel around a curve, the state of travelling around a curve being detected by the transverse acceleration sensor 32.

Figure 2:
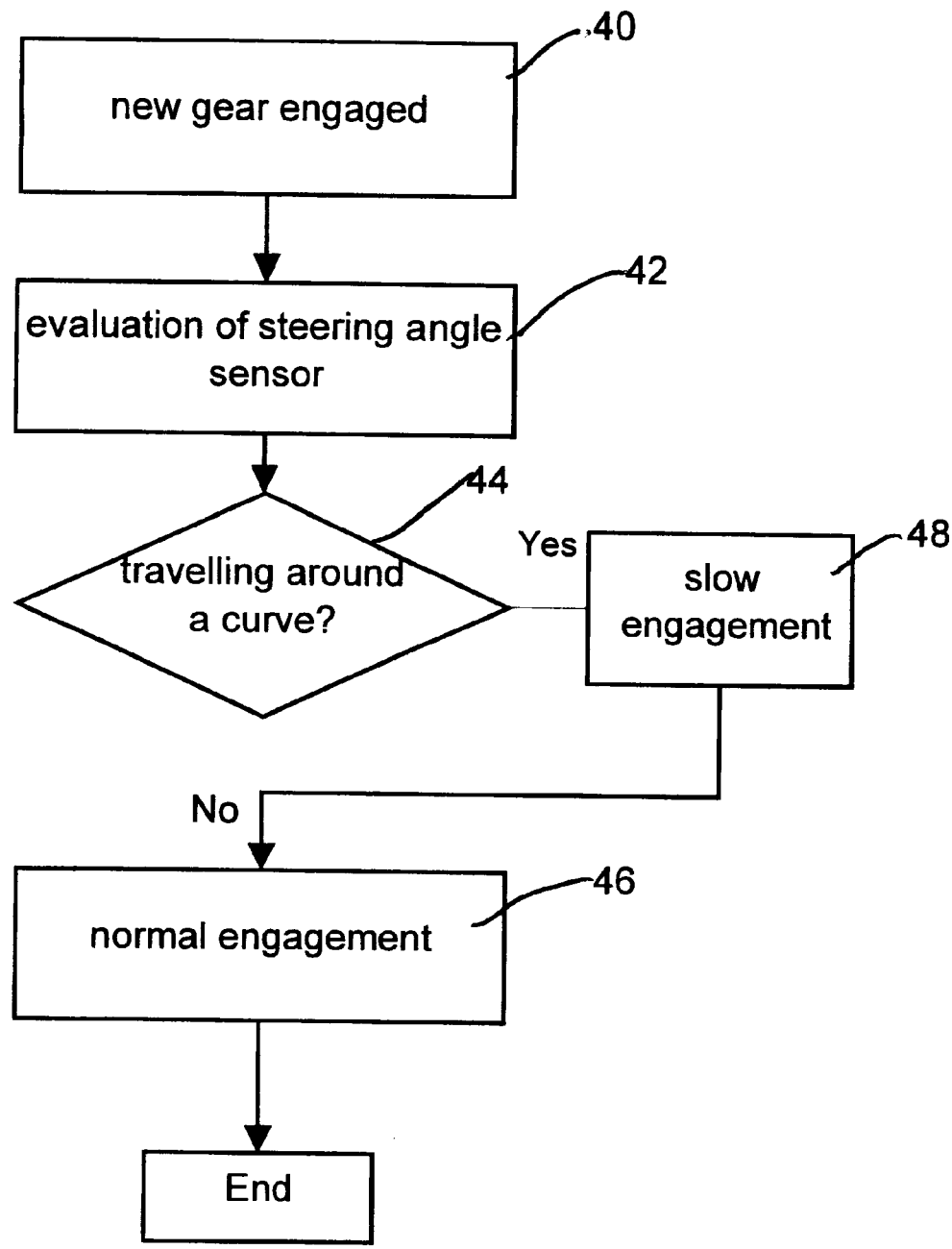
FIG. 2 s a schematic flow chart of a method according to an embodiment of the present invention.

FIG. 2 shows a flow chart for explaining one example of implementing the invention.

It is assumed that at stage 40 a new gear has been engaged by the gearshift lever 14. Prior to stage 40 the clutch 4 was opened by controlling the control device 16 so that at stage 40 the driven wheels are free of forward drive or, if the vehicle brake is not activated, are free of deceleration forces.

As a new gear is engaged, which is detected by the gearbox sensor 20, the signal of for example the steering angle sensor 26 is evaluated in the control device 16 in stage 42 so that in stage 44 it can be established whether the vehicle is or is not travelling around a curve. If no state of travelling around a curve is diagnosed then in stage 46 the clutch 4 is engaged according to the usual engagement process, this engagement process being optimized with regard to rapid shift, gear change comfort and energy consumption for shifting.

If in stage 44 it is established that the vehicle is travelling around a curve, then in the control device 16 a program is activated for a slow engagement which becomes active in stage 48 in order to close the clutch 4 after shifting into the new gear. This slower engagement, when changing into a lower gear, takes place by engaging the engine and through the enforced increases in revs or, when changing into a higher gear, by reductions in revs. Thus, no sudden high forces in the longitudinal direction of the vehicle appear at the driven rear wheels 12 which could lead to the lateral forces which can be transmitted being exceeded and the vehicle skidding.

It is evident that the method described can be modified and refined in many respects. By way of example the engagement program which is activated when the state of travelling around a curve is determined can be slowed down proportional to the transverse acceleration determined.

In a more expensive embodiment, the longitudinal forces transmitted by the driven rear wheels 12 to the road can be determined for example by means of an acceleration sensor active in the longitudinal direction of the vehicle and the engagement process can be controlled so that the sum of the longitudinal forces and transverse forces does not exceed a certain amount.

The invention can be used not only for automated clutches used in conjunction with manual shift transmissions. It can likewise be used when the shift transmission 6 is automated for example with gear changes proceeding according to predetermined programs. It is possible depending on the relevant program also to change gear within a curve and in this case the algorithms stored in the control device 16 ensure that the engagement of the clutch 4 takes place so smoothly after a gear change that there is no danger of the vehicle skidding sideways.

Both in the case of automated shift transmissions and manual shift transmissions the control device 16 can, in addition to adapting the operation of the clutch to travelling around a curve, also control the engine itself for a limited period of time so that inadmissible accelerations or brakings are suppressed. A throttle valve or other power adjustment member of the engine is then not activated directly by the accelerator pedal 18 but instead the accelerator pedal 18 operates through a servo motor through a control device for adjusting a power adjustment member of the engine.

The gearbox 6 can also be a CVT gearbox, the operation of which is controlled when travelling around a curve so that predetermined acceleration and deceleration forces at the wheel surfaces are not exceeded. When driving in a straight line, the CVT gearbox changes for example its transmission ratio very rapidly according to requirements (when pressing down the accelerator, for example for overtaking, it switches very rapidly to a shorter (lower) transmission ratio or when letting up the accelerator switches to a longer (higher) transmission ratio). In contrast this change in transmission ratio takes place correspondingly more slowly when travelling around a curve.

The clutch 4 can in a modified embodiment also be a torque converter with integrated lock-up clutch. The converter characteristic and/or actuation of the lock-up clutch can be handled by the control device 16 in dependence on the curve.

Figure 3:
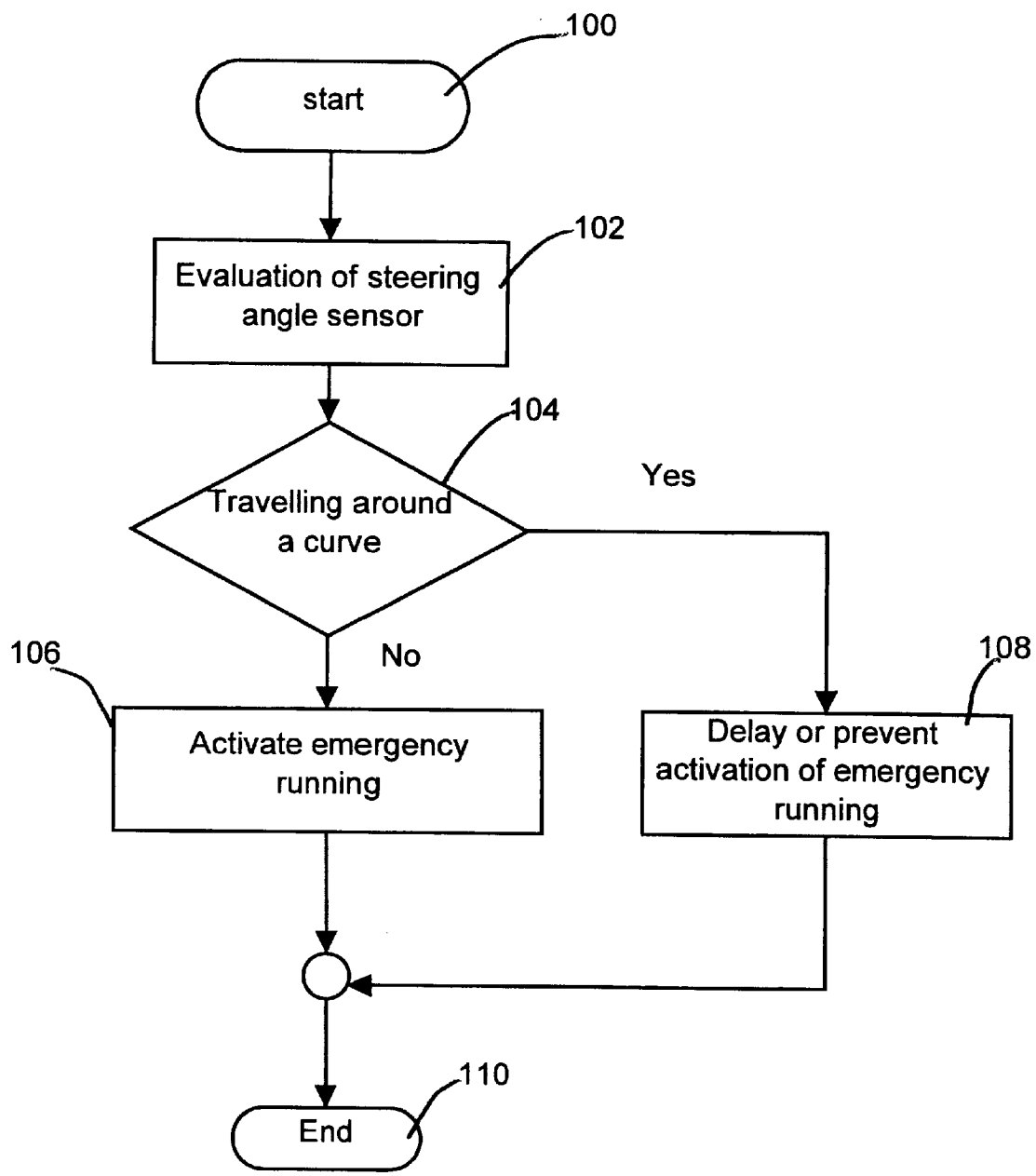
FIG. 3 is a schematic chart of a method according to an embodiment of the present invention.

In an alternative embodiment of the invention, see FIG. 3, if an emergency operation program has to be activated, and this takes place when travelling around a curve, this emergency operation program is activated with delay so that again high circumferential forces or longitudinal forces acting at the drive wheels are avoided. When changing over a control strategy program from a normal operating mode of the vehicle to a replacement strategy or emergency operation program relatively large gradients of the circumferential forces from the tires or axles of a vehicle can appear. This can be disadvantageous when changing over into an emergency operation program. Therefore it can also be advantageous if when changing into an emergency running operation the steering angle or the relevant angle included between the wheel and the longitudinal axis of the vehicle is detected and the change-over is delayed or even prevented when the state of travelling around a curve is detected.

FIG. 3 shows in block 100 the call-up of the control strategy according to the invention which undertakes in block 102 an evaluation of the steering angle, for example by means of a steering angle sensor. If the steering angle is within a predeterminable area outside of a central position, then in block 104 it concludes the state of travelling around a curve. If this is the case, then in block 108 the activation of an emergency running operation is delayed or prevented for a predeterminable amount of time. This prevention exists until following the inquiry in block 104, the state of travelling around a curve no longer exists and the emergency running operation is activated in block 106. With a delay in activating the emergency running operation, at the end of the waiting time the program is switched into emergency mode even if the state of travelling around a curve still exists. At block 110 the routine is first terminated and recalled again in the next control cycle at 100. p In order to make an evaluation of the steering angle signal it is preferable to use for example the direct evaluation of a sensor signal of the steering angle sensor which on exceeding a predeterminable threshold value is a clear indication of the state of travelling around a curve. The threshold value can vary for example with the vehicle speed and/or the throttle valve angle and/or the gear engaged in the gearbox. Likewise filtering of the steering angle signal can take place so that a temporary change in the steering angle signal does not lead to drastic effects. Furthermore it is possible by means of a computer program to calculate from the steering angle signal and where applicable other signals, such as for example wheel speeds, the angular speed of the vehicle about its vertical axis (yaw rate). From reaching a predeterminable variable threshold value of the yaw rate the state of travelling around a curve can be concluded.

In a method for influencing a shift process connected with a change in transmission ratio when driving a motor vehicle, the state of travelling around a curve is detected and the shift process occurring while travelling around a curve is influenced so that the longitudinal forces which are active at the driven wheels as a result of a down shift.

Figure 4:
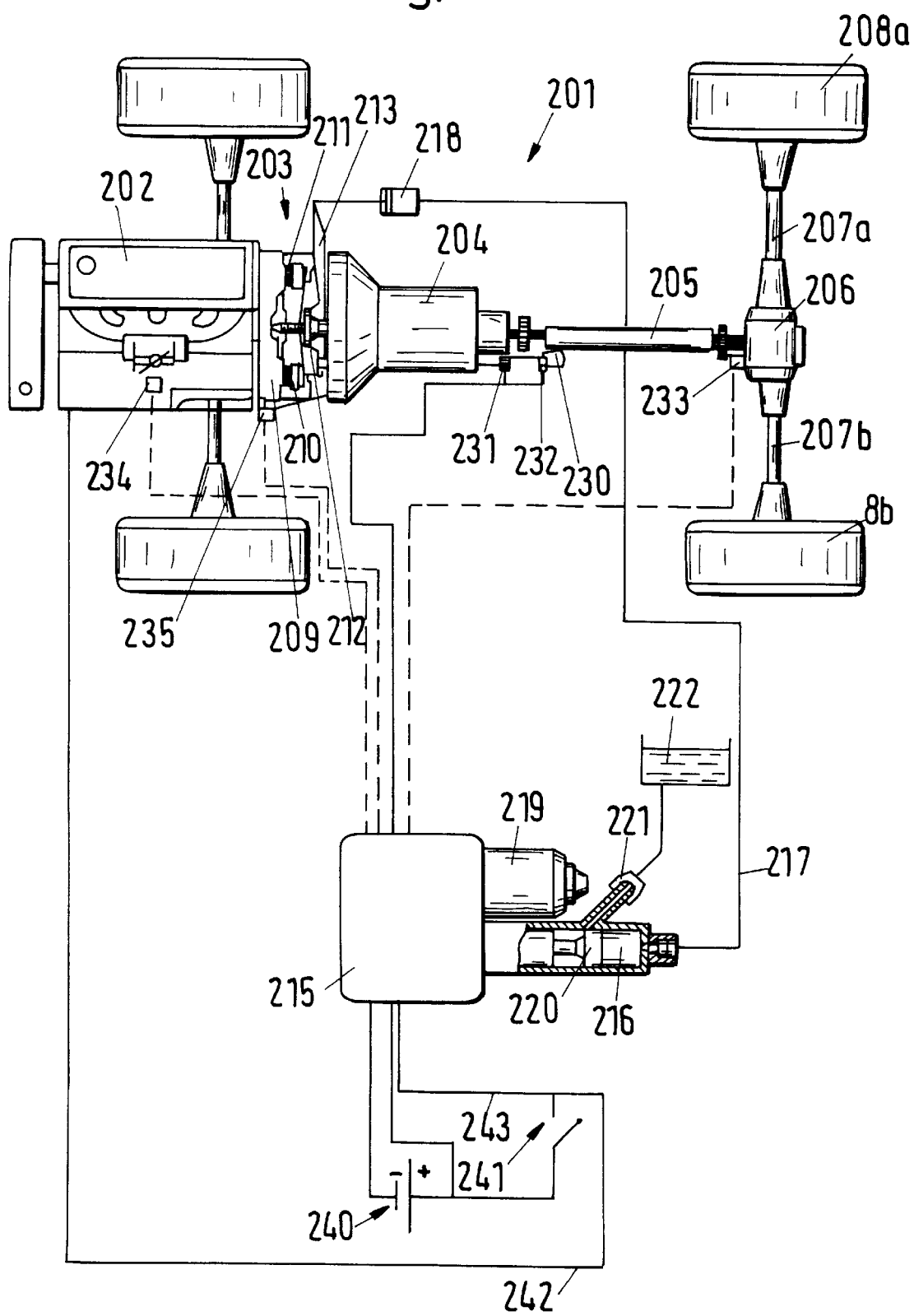
FIG. 4 is a diagrammatic illustration of an apparatus according to an embodiment of the present invention.

FIG. 4 shows a vehicle 201 with a drive unit 202, such as an internal combustion engine or hybrid drive assembly with an internal combustion engine and with an electric motor, a torque transfer system, such as a clutch 203 and a gearbox 204 wherein on the output side of the gearbox is a drive shaft 205 which drives by means of a differential 206 two drive shafts 207a and 207b which in turn drive the driven wheels 208a and 208b. The torque transfer system 203 is shown as a friction clutch with a flywheel 209, a pressure plate 210, a clutch disc 211, a release bearing 212 and a disengagement fork 213. The disengagement fork is biased by means of an actuator 215 through a master cylinder 216, a pressurised medium line, such as a hydraulic line 217, and a slave cylinder 218. The actuator is shown as an actuator operated by pressurised medium which has an electric motor 219 which operates a master cylinder piston 220 through a gearbox. The torque transfer system can be engaged and disengaged through the pressurised medium line 217 and the slave cylinder 218. Furthermore the actuator 215 includes the electronics for its operation and control, that is both the power electronics and control electronics. The actuator is provided with a valve 221, e.g., a closeable opening for fluid exchange of a hydraulic system which is connected to a reservoir 222 for the pressurised medium.

The vehicle 201 with the gearbox 204 has a gear shift lever 230 on which is mounted a gear detection sensor 231 and a shift intent sensor 232 which detects a shift intent of the driver from the movement of the gearshift lever or from the applied force. Furthermore the vehicle is fitted with a speed sensor 233 which detects the speed of the gear output shaft and the wheel speeds respectively. Furthermore a throttle valve position sensor 234 is mounted which detects the throttle valve position and a rotation sensor 235 which detects the engine speed.

The gear detection sensor detects the position of shift elements inside the gearbox or the gear engaged in the gearbox so that at least the engaged gear is registered by the control unit by means of a signal from the sensor. Furthermore with an analog sensor the movement of the shift elements inside the gearbox can be detected so that it is possible to make an early detection of the next gear to be engaged.

The actuator 215 is powered from a battery 240. Furthermore the vehicle has an (preferable multi-stage) ignition switch 241 which is operated preferable by means of an ignition key whereby the starter of the combustion engine 202 is operated through the lead 242. A signal is forwarded through the lead 243 to the electronics unit of the actuator 215 after which the actuator is activated for example on operating the ignition.

Figure 5:
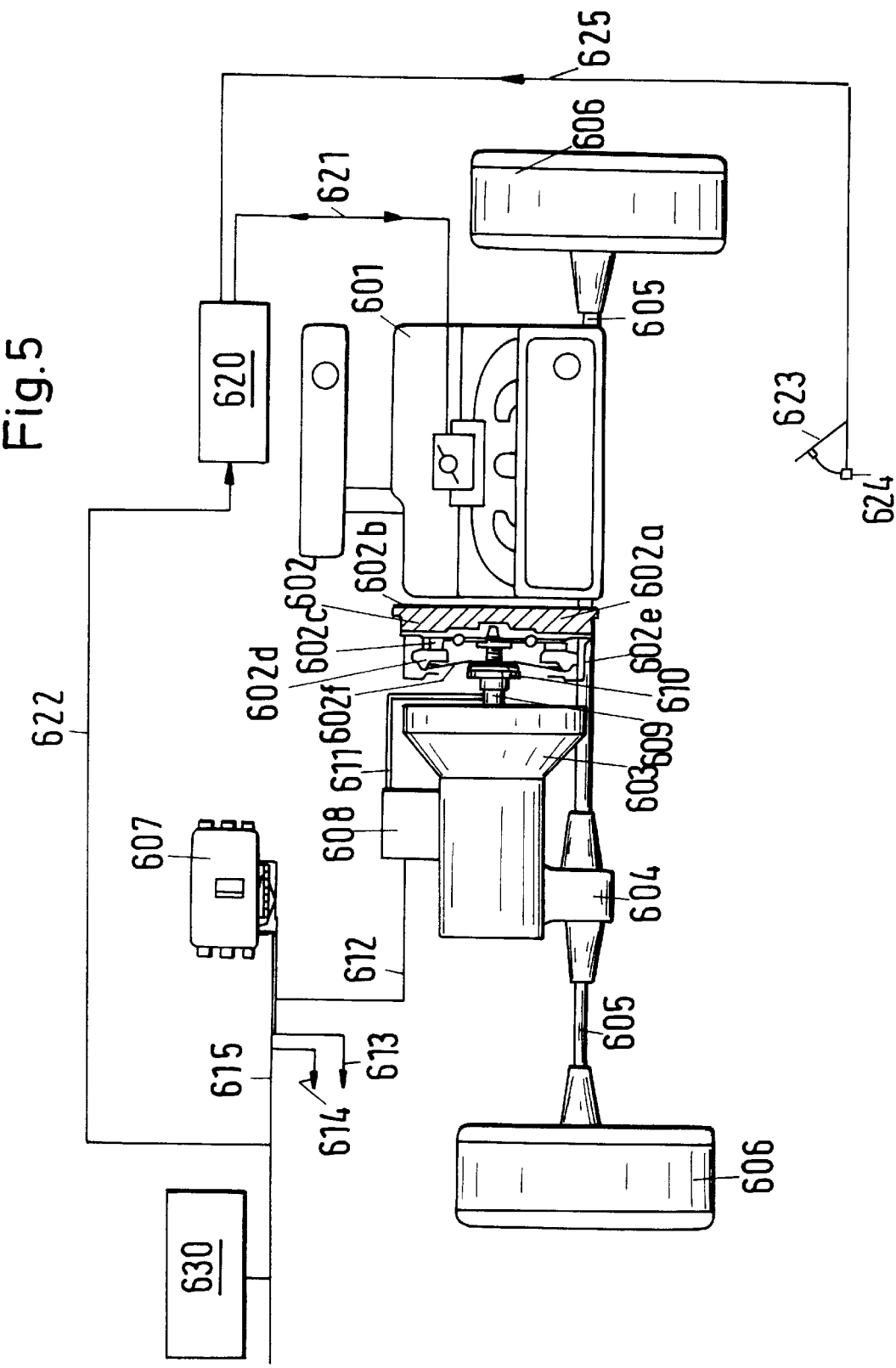
FIG. 5 is a diagrammatic illustration of an apparatus according to an embodiment of the present invention.

FIG. 5 shows a diagrammatic view of a drive train of a motor vehicle with a drive unit 601, such as an internal combustion engine or motor, a torque transfer system 602, such as for example a friction clutch, a dry friction clutch or a wet-running friction clutch, a gearbox 603 as well as a differential 604, output shafts 605 and wheels 606 driven by the output shafts. Speed sensors (not shown) can be mounted on the wheels to detect the speeds of the wheels. The speed sensors can also belong functionally to other electronics units, such as for example an anti-lock braking system (ABS). The drive unit 601 can also be a hybrid drive with for example an electric motor, a flywheel with freewheel and an internal combustion engine.

The torque transfer system 602 is formed as a friction clutch but can also be designed for example as a magnetic powder clutch, multi-plate clutch or torque converter with converter lock-up clutch or another type of clutch. Furthermore a control unit 607 is shown as well as an actuator 608

(shown diagrammatically). The friction clutch can also be formed as a self-adjusting clutch adjusting to wear.

The torque transfer system 602 is mounted on a flywheel 602a or is connected to the flywheel which can be a divided flywheel with a primary mass and a secondary mass, and with a damping device between the primary mass and secondary mass on which a starting gear ring 602b is mounted. The torque transfer system has overall a clutch disc 602c with friction linings and a pressure plate 602d as well as a clutch cover 602e and a plate spring 602f. The clutch is preferably self-adjusting and has in addition means which allow displacement and wear adjustment. A sensor, such as a force or displacement sensor is provided which detects a situation in which an adjustment is necessary and in the event of detection the adjustment is carried out.

The torque transfer system is operated by means of a release member 609 such as for example a pressurised medium operated, such as hydraulic, central release member which can support a release bearing 610. The clutch can be engaged and disengaged by application of a force. The release member can however also be formed as a mechanical release member which operates, biases or governs a release bearing or comparable element.

The actuator 608 controls via a mechanical connection or a pressurised medium line 611 or a transfer section, such as a hydraulic pipe, the mechanical or hydraulic release member or central release member 609 for engaging or releasing the clutch. The actuator 608 furthermore operates with one or several output elements the gearbox for shifting gear. For example a central selector shaft of the gearbox is operated by the output element or the output elements. The actuator thus operates shift elements inside the gearbox to engage, release or change gear stages or transmission ratio stages, such as a central selector shaft or shift rods or other shift elements.

The actuator 608 can also be formed or provided as a shift control cylinder which is mounted inside the gearbox. By being rotated about its own axis, the shift control cylinder moves elements that are guided by guides, e.g., shifter elements, and thereby performs the shift between gear stages. Furthermore the actuator for shifting the gear stages can also contain the actuator for operating the torque transfer system. In this case an active connection with the clutch release member is required.

The control unit 607 is connected through the signal connection 612 to the actuator so that control signals and/or sensor signals or operating state signals can be exchanged, forwarded or retrieved. Furthermore signal connection 613 and 614 are provided through which the control unit is in signal connection at least at times with further sensors or electronics units. Other electronics units of this kind can be for example the engine electronics, anti-lock braking system electronics or anti-slip regulating electronics. Further sensors can be sensors which generally characterise or detect the operating state of the vehicle, such as for example rotation speed sensors of the engine or of the wheels, throttle valve position sensors, accelerator pedal position sensors or other sensors. The signal connection 615 produces a connection to a data bus such as for example a CAN bus through which system data of the vehicle or other electronics can be made available since the electronics units are as a rule cross-linked with each other through computer units.

An automated gearbox can be shifted or a gear change can be performed in a driver-initiated mode where the driver, for example, by means of a selector switch, introduces a signal to shift up or down. Furthermore a signal can also be provided by means of an electronic shift lever to indicate into which gear the gearbox is to be shifted. An automated gearbox can however also carry out a gear change independently by means of for example characteristic values, characteristic lines or characteristic fields and on the basis of sensor signals at certain predetermined points, without the driver having to initiate a gear change.

The vehicle is preferably fitted with an electronic accelerator pedal 623 (or load lever). The accelerator pedal 623 governs a sensor 624 by means of which the engine electronics 620 control or regulate for example the fuel supply, ignition timing, injection time or throttle valve position through the signal lead 621 of the engine 601. The electronic accelerator pedal 623 with sensor 624 is in signal connection with the engine electronics 620 through the signal lead 625. The engine electronics 620 is in signal connection with the control unit 607 through the signal lead 622. Furthermore gear control electronics 630 can also be in signal connection with the units 607 and 620. An electromotorized throttle valve control is practical for this with the position of the throttle valve being governed by the engine electronics. With systems of this kind a direct mechanical connection with the accelerator pedal is no longer necessary or practical.

The typical friction losses of gearbox components and/or input speeds and/or output speeds of the gearbox can be used in order to determine or calculate for example a gearbox temperature, such as for example gearbox fluid temperature or a temperature of a gearbox element. Furthermore the amounts of fluid and fluid flows can be taken into account. The gearbox temperature designation need not however be restricted to the overrun time, but can also be carried out in other operating situations.

The current supply of the control unit of an automated gearbox and/or an automated torque transfer system can be maintained for example in order to implement specific operating functions according to one operating mode of the vehicle, such as for example if when determining temperature or calculating temperature for example by means of temperature models a critical state is detected, such as for example of the clutch, gearbox or synchronizing device or if for example adaptations are active or data are detected or stored such as for example a store of data or adapted values in an EEPROM. Further adaptations of system values of an electric motor, gearbox or of a pressurised medium system, such as hydraulic system can be carried out. Likewise adjustments in the gearbox or on the clutch (for example when the vehicle stopping device is operated) can be demanded or be required to determine friction forces (sliding and adhesive friction forces or friction values) and characteristic values of the actuator (e.g. engine constant, e.g. armature resistance or time constants in the case of the electric motor). Furthermore hydraulic values or other values, such as characteristic lines of valves or other values can be adjusted.

While the present invention has been particularly shown and described with reference to certain embodiments thereof, it will be understood by those skilled in the art that various changes in form and details may be made therein without departing from the spirit and scope of the invention.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead, to a new subject or to new process steps or sequence of process steps insofar as these refer to manufacturing, test and work processes.

What is claimed is:

1. A method for influencing a shift process associated with a change in transmission ratio in a motor vehicle that has driven wheels subject to, in relation to the motor vehicle, longitudinal and transverse forces acting thereon, comprising the steps of:

detecting whether or not the vehicle is traveling around a curve and, if the vehicle is traveling around a curve when the shift process is in progress, influencing the shift process so as to decrease the longitudinal forces that act on the driven wheels as a result of the shift process.

2. The method according to claim 1, wherein the detecting step includes measuring the transverse forces and if the transverse forces exceed a predetermined value, the shift process is influenced so as to decrease the longitudinal forces that act on the driven wheels as a result of the shift process.

3. The method according to claim 1, wherein, the motor vehicle has an automated clutch and when shifting while traveling around a curve, engagement of the automated clutch after the shift is slowed down.

4. The method according to claim 1, wherein the motor vehicle has a continuously variable transmission and a change in transmission ratio occurring therein is slowed down when traveling around a curve.

5. The method according to claim 1, wherein the vehicle has an emergency running mode and, if the emergency running mode is to be activated when the vehicle is traveling around a curve, activation of the emergency running mode is delayed.

6. The method according to claim 1, wherein the vehicle has a normal running mode and an emergency running mode and, if the emergency running mode is to be activated when the vehicle is traveling around a curve, activation of the emergency running mode includes a continuous transition from the normal running mode to the emergency running mode.

7. The method according to claim 1, wherein the detecting step includes measuring and evaluating a transverse acceleration of the motor vehicle.

8. The method according to claim 1, wherein the motor vehicle has wheels located on an axle, and the detecting step includes evaluating a difference in the respective speed of each individual wheel compared to the mean speed of the wheels.

9. The method according to claim 1, wherein the motor vehicle has steering wheels and the detecting step includes evaluating the steering angle of the steering wheels and the vehicle speed.

10. The method according to claim 1, wherein the motor vehicle has a power steering system and the detecting step includes evaluating at least one operating parameter thereof.

11. The method according to claim 1, wherein the motor vehicle has a navigation system and the detecting step includes evaluating signals of the navigation system.

12. The method according to claim 11, wherein the navigation system is a global positioning system.

13. An apparatus for influencing a shift process connected with a change in transmission ratio when driving a motor vehicle that has a set of driven wheels subject to, in relation to the vehicle, longitudinal and transverse forces acting thereon, comprising:

a detector for detecting whether or not the vehicle is traveling around a curve and, a transmission ratio shifter that is responsive to the detector and, if the vehicle is traveling around a curve when the shift process is in progress, performs the shift process in a manner that decreases the longitudinal forces that act on the driven wheels as a result of the shift process.

14. The apparatus of claim 13, wherein the detector detects whether or not the vehicle is traveling around a curve by sensing the transverse forces and if the transverse forces exceed a predetermined value, the transmission ratio shifter performs the shift process in a manner that decreases the longitudinal forces that act on the driven wheels as a result of the shift process.

15. The apparatus according to claim 13, wherein the motor vehicle has an automated clutch and when shifting while traveling around a curve, the engagement of the automated clutch after the shift is slowed down.

16. The apparatus according to claim 13, wherein the motor vehicle has a continuously variable transmission and a change in transmission ratio occurring therein is slowed down when traveling around a curve.

17. The apparatus according to claim 13, wherein the vehicle has an emergency running mode and, when traveling around a curve, an activation of the emergency running mode is delayed.

18. The apparatus according to claim 13, wherein the vehicle has a normal running mode and an emergency running mode and, when traveling around a curve, an activation of the emergency running mode includes a continuous transition from the normal running mode to the emergency running mode.

19. The apparatus according to claim 13, wherein the detector includes a transverse acceleration sensor.

20. The apparatus according to claim 13, wherein the motor vehicle has wheels located on an axle and the detector measures and evaluates a difference in the respective speed of each individual wheel of one axle compared to the mean speed of the wheels.

21. The apparatus according to claim 13, wherein the motor vehicle has steering wheels and the detector measures and evaluates the steering angle and the speed of the vehicle.

22. The apparatus according to claim 13, wherein the motor vehicle has a power steering system and the detector senses and evaluates at least one operating parameter thereof.

23. The apparatus according to claim 13, wherein the motor vehicle has a navigation system and the detector evaluates signals of the navigation system.

24. The apparatus according to claim 13, wherein the navigation system is a global positioning system.

25. A method for influencing a shift process associated with a change in transmission ratio in a motor vehicle that has driven wheels subject to, in relation to the motor vehicle, longitudinal and transverse forces acting thereon, comprising the steps of:

detecting whether or not the vehicle is traveling around a curve and, if the vehicle is traveling around a curve when the shift process is in progress, influencing the shift process so as to decrease the longitudinal forces that act on the driven wheels as a result of the shift process, wherein the vehicle has an emergency running mode and, if the emergency running mode is to be activated when the vehicle is traveling around a curve, activation of the emergency running mode is delayed.

26. A method for influencing a shift process associated with a change in transmission ratio in a motor vehicle that has driven wheels subject to, in relation to the motor vehicle, longitudinal and transverse forces acting thereon, comprising the steps of:

detecting whether or not the vehicle is traveling around a curve and, if the vehicle is traveling around a curve when the shift process is in progress, influencing the shift process so as to decrease the longitudinal forces that act on the driven wheels as a result of the shift process, wherein the vehicle has a normal running mode and an emergency running mode and, if the emergency running mode is to be activated when the vehicle is traveling around a curve, activation of the emergency running mode includes a continuous transition from the normal running mode to the emergency running mode.

27. An apparatus for influencing a shift process connected with a change in transmission ratio when driving a motor vehicle that has a set of driven wheels subject to, in relation to the vehicle, longitudinal and transverse forces acting thereon, comprising:

a detector for detecting whether or not the vehicle is traveling around a curve and, a transmission ratio shifter that is responsive to the detector and, if the vehicle is traveling around a curve when the shift process is in progress, performs the shift process in a manner that decreases the longitudinal forces that act on the driven wheels as a result of the shift process, wherein the vehicle has an emergency running mode and, when traveling around a curve, an activation of the emergency running mode is delayed.

28. An apparatus for influencing a shift process connected with a change in transmission ratio when driving a motor vehicle that has a set of driven wheels subject to, in relation to the vehicle, longitudinal and transverse forces acting thereon, comprising:

a detector for detecting whether or not the vehicle is traveling around a curve and, a transmission ratio shifter that is responsive to the detector and, if the vehicle is traveling around a curve when the shift process is in progress, performs the shift process in a manner that decreases the longitudinal forces that act on the driven wheels as a result of the shift process, wherein the vehicle has a normal running mode and an emergency running mode and, when traveling around a curve, an activation of the emergency running mode includes a continuous transition from the normal running mode to the emergency running mode.

\* \* \* \* \*

UNITED STATES PATENT AND TRADEMARK OFFICE
CERTIFICATE OF CORRECTION

PATENT NO.     : 6,322,477 B1
DATED          : November 27, 2001
INVENTOR(S)    : Jurgen Eich et al.

It is certified that error appears in the above-identified patent and that said Letters Patent is hereby corrected as shown below:

<u>Title page,</u>
Item [73], Assignee, change "LuK Getriebe GmbH" to -- LuK Getriebe Systeme GmbH --.

Signed and Sealed this

Twentieth Day of May, 2003

JAMES E. ROGAN
*Director of the United States Patent and Trademark Office*